(No Model.)

J. T. BENTLEY.
COOLING APPARATUS.

No. 590,718. Patented Sept. 28, 1897.

Witnesses:
L. C. Hills.
A. L. Hough.

Inventor:
James T. Bentley
by Franklin H. Hough
Atty.

THE NORRIS PETERS CO., PHOTO-LITHO., WASHINGTON, D. C.

UNITED STATES PATENT OFFICE.

JAMES THOMAS BENTLEY, OF CIRCLEVILLE, OHIO.

COOLING APPARATUS.

SPECIFICATION forming part of Letters Patent No. 590,718, dated September 28, 1897.

Application filed November 27, 1896. Serial No. 613,594. (No model.)

*To all whom it may concern:*

Be it known that I, JAMES THOMAS BENTLEY, a citizen of the United States, residing at Circleville, in the county of Pickaway and State of Ohio, have invented certain new and useful Improvements in Cooling Apparatus; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in cooling apparatus designed especially for cooling milk, cream, and other liquids from any degree of heat rapidly down to any temperature desired without exposure, and is especially adapted for cooling milk and cream, following any process of pasteurization or sterilization, and also for cooling cream as it comes from factory separators or as delivered by cream haulers, &c.

More specifically the invention relates to the provision of an agitator, which is designed to be reciprocated within a chamber containing a series of coiled pipes, about which is contained the cooling mixture of whatever character, the agitator being adapted to thoroughly mix the ice with the ingredients, forming a cooling mixture.

To these ends and to such others as the invention may pertain the same consists, further, in the novel construction, combination, and adaptation of parts, as will be hereinafter more fully described and then specifically defined in the appended claims.

The invention is clearly illustrated in the accompanying drawings, which, with the letters of reference marked thereon, form a part of this specification, and in which drawings similar letters of reference indicate like parts throughout both the views, in which—

Figure 1:
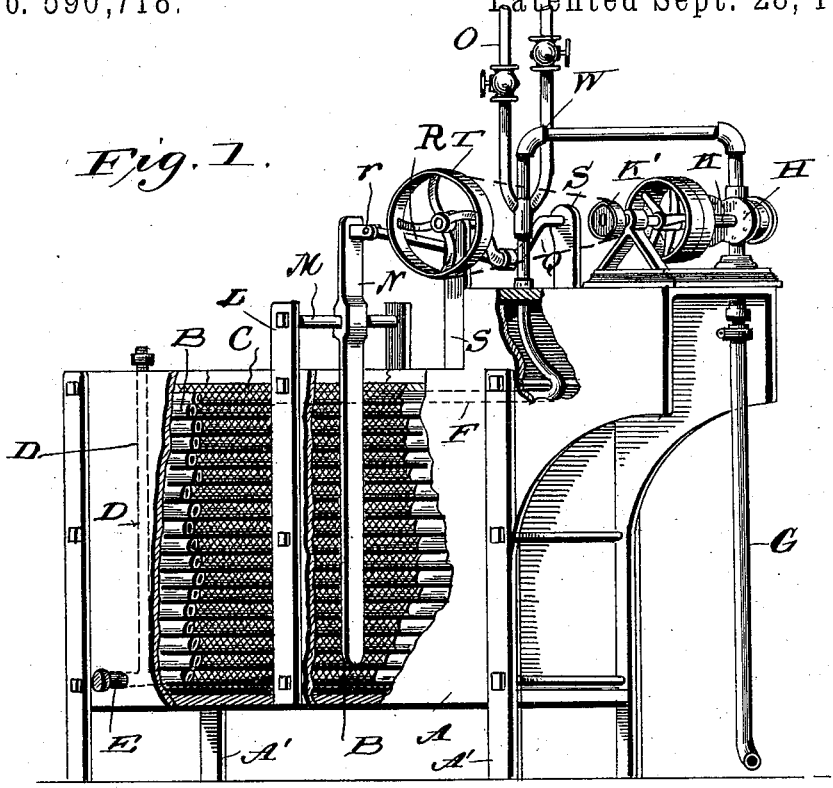
Figure 2:
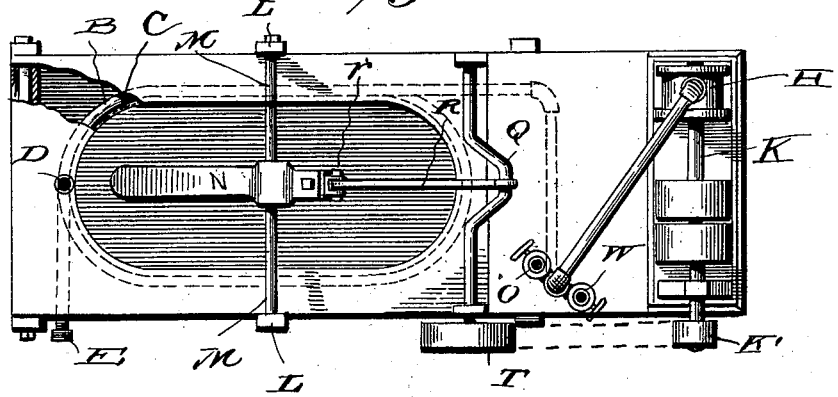

Figure 1 is a side elevation of a cooling apparatus and attachments, a portion being broken away to better illustrate the details of the invention. Fig. 2 is a top plan view of the cooling apparatus and attachments having a portion of its top broken away.

Reference being had to the details of the drawings by letter, A designates a receptacle, which is mounted on legs A' and contains a coil of pipe B, extending about the inner walls of the receptacle from the top to the bottom thereof, and located about the inner circumference of the coil is a screen C, which is provided to prevent the ingredients of the mixture—as the particles of ice, salt, &c.—coming in contact or from getting between the layers of pipe, but more particularly to protect the pipe from injury. Communicating with the lower outlet-passage of the coil is an upwardly-extending pipe D, through which the cooled milk or other liquid is drawn off. At the lower end of the cooling-receptacle and leading off from the coil is a discharge end E, by which the entire coil may be drained when it is desired to cleanse the same or for any other purpose. Connected to the upper end of the coil, at the right-hand corner of the receptacle, is the pipe F, through which milk, cream, or other liquids are conveyed to the coils. This pipe communicates with the vat or other source of supply, which supply of milk or other liquid is drawn through a pipe G through the medium of a pump of any suitable construction.

In the drawings I have shown a rotary pump H, of well-known construction, which is located in the passage-way leading from pipe F to pipe G. This pump is operated by a shaft K, which receives power from any source of supply. Mounted on the standards L, secured to the outside walls of the cooling-receptacle, is the shaft M, on which is journaled the stirrer N, which extends down to nearly the bottom of the cooling-receptacle. To the upper end of the said stirrer is hinged at *r* the detachable crank R, which is journaled at its other end to the crank-shaft Q, mounted in suitable standards S on the upright portion of the casing. On one end of this crank-shaft Q is carried a pulley T, which may be belted on the pulley K'.

O designates a water-pipe which communicates with the tube F, and through which water is supplied when it is desired to flush the coil in the cooling-receptacle at the conclusion of service. Connected to the said pipe F opposite the openings of the pipe O is a steam-pipe W, through which steam may enter when it is desired to sterilize the passage-way leading through the coil of pipe, as at the conclusion of service or just before service, as desired, said water and steam pipes being so constructed that only one may be connected with tube F at a time, as desired.

From the foregoing it will be seen that the liquid which it is desired to cool at any degree of temperature is caused to flow through the coil of pipe which surrounds the stirrer, which is adapted to agitate the ingredients of the cooling mixture to get the full benefit out of the ingredients used in making up the brine or mixture of whatever combination.

Having thus described my invention, what I claim to be new, and desire to secure by Letters Patent, is—

1. An apparatus for cooling liquids, consisting of a receptacle; coil of pipe contained therein, netting contained about the inner circumference of the coil and a reciprocating agitator working in the space within the coil; means for operating the same, substantially as shown and described.

2. In a cooling apparatus, the combination with the cooling-receptacle, coil of pipe located therein, the agitator N, mounted on a shaft M, a pitman connected to the upper end of the said agitator, and a crank-shaft for operating the said pitman, substantially as shown and described.

3. In a cooling apparatus, the combination with the cooling-receptacle, coil of pipe located therein, standards L secured to the outside of the casing, shaft M mounted in the upper ends of the said standards, agitator N journaled on the said shaft M, with its free end extended down to nearly the bottom of the space within the cooling-receptacle, the pitman R connected to the upper end of the agitator, means for operating the same, of the supply-pipes and pumps leading to the coil and the outlet-pipes connected to the lower end of the coil, substantially as shown and described.

In testimony whereof I affix my signature in presence of two witnesses.

JAMES THOMAS BENTLEY.

Witnesses:
CHRIS A. WELDON,
H. D. LOWE.